March 10, 1931.  J. FLAMMANG ET AL  1,795,595
PISTON
Filed Feb. 18, 1924  3 Sheets-Sheet 1
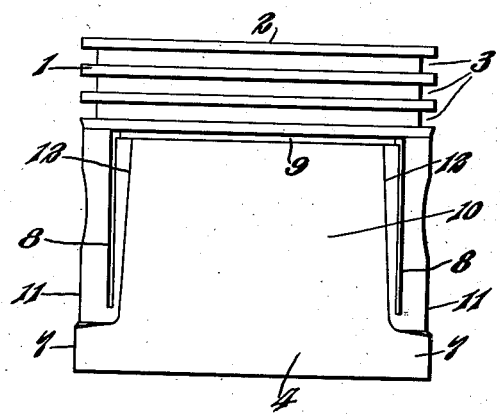
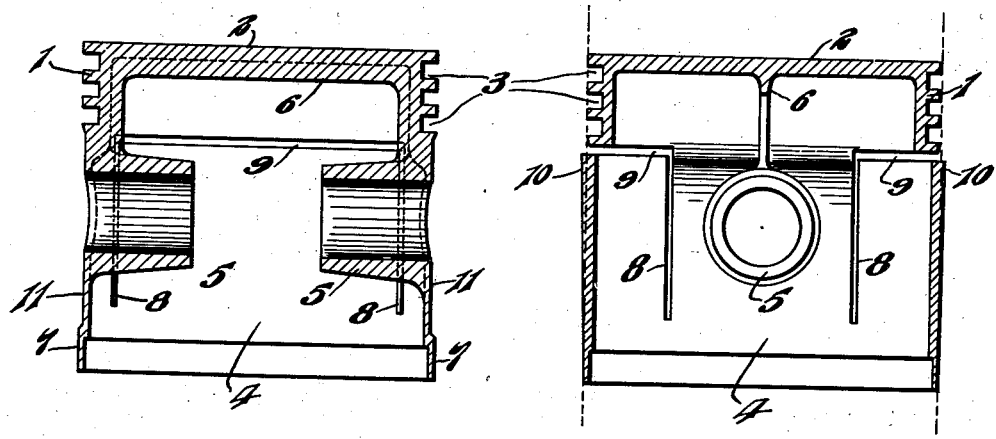
Inventors.
JOHN FLAMMANG.
PERCY L. BOWSER.
Attorney.

March 10, 1931.  J. FLAMMANG ET AL  1,795,595
PISTON
Filed Feb. 18, 1924   3 Sheets-Sheet 2
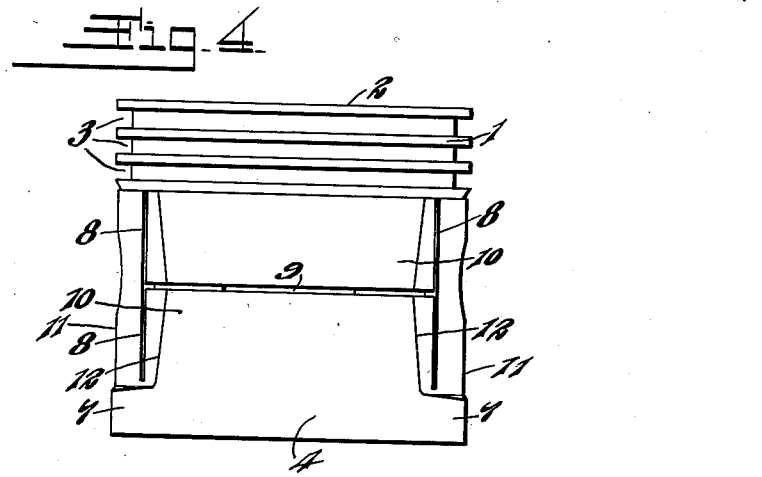
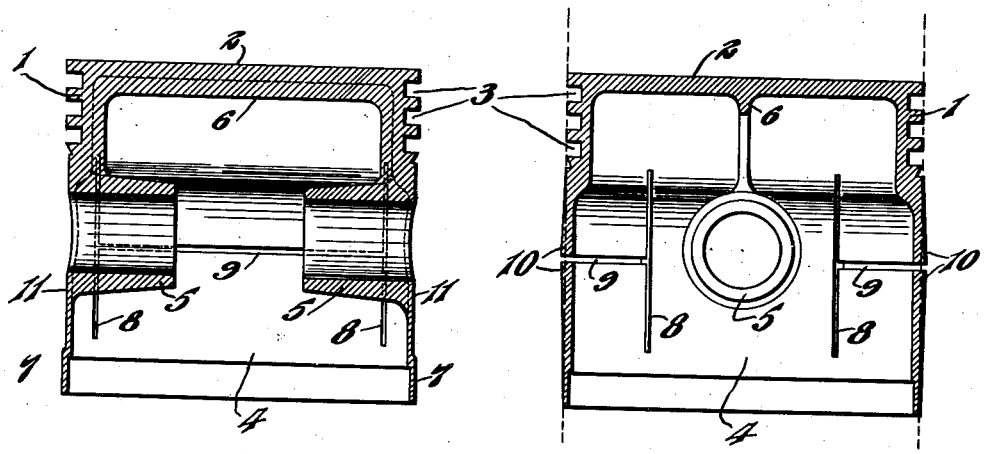
Inventors.
JOHN FLAMMANG.
AND PERCY H. BOWSER.
Attorney.

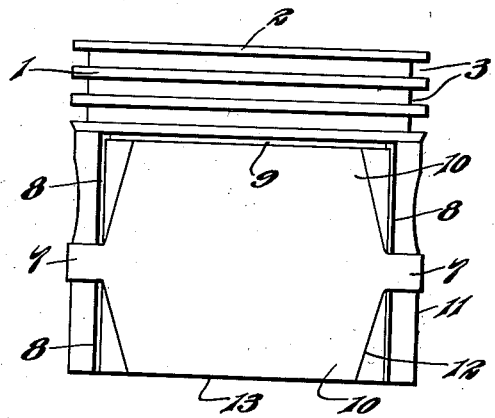
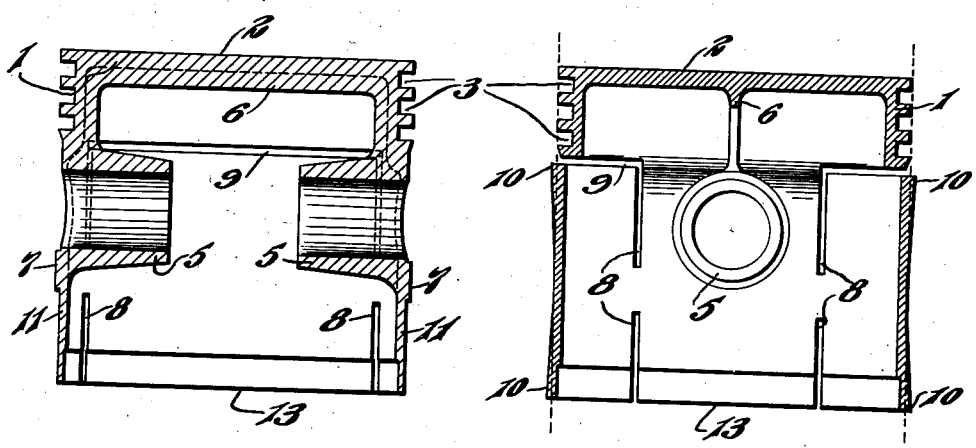

Patented Mar. 10, 1931

1,795,595

UNITED STATES PATENT OFFICE

JOHN FLAMMANG, OF UNIVERSITY CITY, AND PERCY L. BOWSER, OF ST. LOUIS, MISSOURI, ASSIGNORS, BY MESNE ASSIGNMENTS, TO THE STERLING CORPORATION, OF WILMINGTON, DELAWARE, A CORPORATION OF DELAWARE

PISTON

Application filed February 18, 1924. Serial No. 693,511.

This invention relates to trunk pistons, such as are used in internal combustion engines. More particularly this invention has to do with pistons constructed of thermally expansible metal, such as aluminum alloys.

In the construction of these alloy pistons, special allowance must be made for the expansion of the piston when it gets hot. Since the coefficient of expansion of the alloy is greater than that of cast iron which is ordinarily used for casting cylinders, a large clearance must be allowed between the piston and the cylinder wall so as to allow for this unequal expansion of piston and cylinder. The clearance required is often so large that it is difficult to provide for a good bearing between piston and cylinder at all temperatures.

One of the objects of this invention, therefore, is to provide a piston which may be constructed of thermally expansible metal and in which provision is made for a good bearing between the piston and cylinder, while at the same time allowing for unequal expansion.

Another object of this invention is to provide such a piston which will have a yielding bearing on the cylinder walls.

Another object of this invention is to provide such a piston which will have an extended bearing covering a major portion of the arc of contact between piston and cylinder.

Another object of this invention is to provide such a piston which shall be cheap to construct, and reliable and durable in service.

Further objects will appear from the detail description taken in connection with the accompanying drawings, in which:

Figure 1 is a view in elevation of a piston showing one embodiment of this invention;

Figure 2 is a longitudinal section of Figure 1 taken through the wrist pin bearings;

Figure 3 is a similar section, taken at right angles to Figure 2;

Figures 4, 5 and 6 are views similar respectively to Figures 1, 2 and 3, and illustrating another embodiment of this invention; and Figures 7, 8, and 9 are similar views illustrating still another embodiment of this invention.

Referring to the accompanying drawings, 1 designates the body of the piston having a head 2 and which may be provided with the usual piston ring grooves 3. The piston is further provided with a skirt 4 upon which are mounted wrist pin bearings 5. The bearings 5 may be joined by means of one or more ribs 6, or similar members, to the body 1 and the head 2 in order to transmit power from the head to the wrist pin bearings, and vice versa.

In order to provide ample clearance to allow for expansion of the piston body, the same may be formed with a diameter considerably less than the cylinder bore. Enough clearance may be allowed so that full expansion of the piston body is permitted. In order to provide a bearing between the piston and the cylinder bore, certain sections of the skirt 4 are cut from the skirt proper and flared outwardly so as to have an apparent diameter at the flared portions greater than the cylinder bore. When the piston is inserted in the bore, these flared portions will press against the cylinder walls with a yielding pressure and provide a good bearing so as to prevent looseness or so-called "piston slap". As expansion of the body takes place, these flared portions will simply spring and maintain their yielding contact with the cylinder wall throughout the expansion and thereby provide a good bearing at all temperatures.

In the embodiment shown in Figures 1, 2 and 3 the lower rim 7 of the skirt 4 is machined in the usual manner for clearance in the cylinder usually greater than that of the body 1 but so as to make ample allowance for expansion. By means of longitudinal slots or saw cuts 8 and transverse cuts 9, a rectangular section 10 is cut from the skirt on each side of the piston so as to provide substantially rectangular sections within the side walls of the piston. These sections are cut from opposite sides facing transversely of the axis of the wrist pin bearings as it is at these portions that the piston bears most heavily against the cylinder wall. These sections 10 are integrally connected at their lower ends with the skirt proper adjacent the rim 7 so that they will be firmly but resiliently supported at their lower ends. The upper ends of these sections adjacent the slots 9 are flared outwardly to a diameter slightly larger than the cylinder bore. The flare of the cut portions of the skirt is shown greatly exaggerated in dimensions in Figure 3, in which the vertical dotted lines indicate the diameter of the body 1. These ends are entirely free of the surrounding material of the skirt and are adapted and capable, therefore, of free and independent movement in flexing about their lower supports in accordance with the expansion of the piston. Adjacent each end of the wrist pin bearings, the skirt is recessed as indicated at 11, so that this portion of the skirt never comes in contact with the cylinder wall at any time. These recesses 11 terminate along lines 12 which are inclined to the axis of the piston so as to avoid forming a sharp corner which will tend to score the cylinder.

The sections 10 extend over a major portion of the arc of contact between the piston and the cylinder bore so as to provide an extended bearing for these sections to take the pressure of the piston against the cylinder wall. The sections are cut rectangularly so that the flared ends thereof have an extended contact with the cylinder wall, thereby providing a broad bearing surface at the point of greatest pressure. These sections furthermore extend longitudinally of the piston so that flexure thereof will not tend to distort the piston.

In the embodiment shown in Figures 4, 5 and 6, the slot 9 is placed near the middle portion of the skirt, that is, substantially midway between the body 1 and the lower rim 7. This provides two sections 10 on each side of the piston. These sections again are flared at the portion adjacent the slot 9 and are rigidly supported on the skirt at their opposite ends. This construction provides mutually opposed sections which are free for independent movement at their adjacent portions, namely adjacent the slot 9, and are rigidly supported at their other portions.

In the embodiment illustrated in Figures 7, 8 and 9, the rim 7 is placed near the middle of the skirt and the sections 10 are formed to extend in opposite directions therefrom. In this embodiment the mutually opposite sections 10 are supported at their adjacent ends and are free for independent movement at their other ends. In this form, as in the other embodiments, the portions adjacent the slot 9 and the extreme lower end 13 are flared as indicated in Figure 9. This embodiment also forms flexible sections rigidly supported at one end and free for flexure at the other.

In the manufacture of these pistons, it is clear that a simple process of forming the same may be employed. After the piston is cast, the same may be machined by turning or grinding or otherwise forming the outside to the usual shape, except that the portions of the skirt to be flared are machined to a diameter slightly in excess of the cylinder bore. After this has been done the recessed portions 11 may be machined out on a uniform radius somewhat greater than and eccentric with respect to the piston, which process will of itself form the inclined edges 12. The slots 8 and 9 may then be cut so as to form the sections 10.

It is apparent that in accordance with this invention a piston is provided which may be constructed of metal having a high thermal expansion and which will at the same time provide for a snug fit in the cylinder at all temperatures. The expansion is taken care of by providing the body 1 of a sufficiently reduced diameter so that it will not expand to a size larger than the cylinder bore under the temperatures involved in operation. A gas seal is provided in the usual way by packing rings in the grooves 3. The flared sections 10 being of slightly larger diameter when cold than the cylinder bore will fit the bore and bear against the cylinder walls with a yielding pressure. This will provide for a good bearing even when the engine is cold. As the engine heats up, the piston will normally expand until the body 1 attains a diameter nearly equal to that of the bore. During such expansion the sections 10 may accommodate themselves thereto by flexing about their point of support at the rim 7. Thus a good bearing but under yielding pressure may be maintained between piston and cylinder walls. Furthermore due to the flaring skirt, the piston is enabled to aline itself automatically in the cylinder; in fact the construction of the piston and its arrangement on the wrist pin bearing is such as to cause the piston to have a self-alining bearing both in the cylinder and on the pitman or connecting rod.

It is obvious that various changes may be made in details of construction without departing from the spirit of this invention; it is, therefore, to be understood that this invention is not to be limited to the specific details shown and described.

Having thus described the invention, what is claimed is:

1. A trunk piston, comprising, a head, a skirt and bearings, said skirt being cut along and transversely thereof to provide a pair of oppositely directed substantially rectangular sections integrally connected to a circumferentially continuous portion of said skirt and free for outward movement at their other ends, said free ends being flared.

2. A trunk piston, comprising, a head, a skirt and bearings, said skirt being cut along and transversely thereof to provide opposite pairs of oppositely directed substantially rectangular sections integrally connected to a circumferentially continuous portion of said skirt and free for outward movement at their other ends, said free ends being flared.

3. A trunk piston, comprising, a head, a skirt and bearings, said skirt being cut by a pair of longitudinal slots joined intermediate their ends by a transverse slot to provide oppositely directed substantially rectangular sections integrally connected to a circumferentially continuous portion of said skirt and free for outward movement at their other ends, said free ends being flared.

4. A trunk piston, comprising, a head, a skirt and bearings, said skirt being cut by a plurality of longitudinal slots joined in pairs by transverse slots to provide oppositely directed sections integrally connected to a circumferentially continuous portion of said skirt and free for outward movement at their other ends, said free ends being flared.

5. A piston for internal combustion engines, comprising, a body having a skirt and wrist-pin bearings on said skirt, said skirt being cut to provide longitudinally and oppositely extending rectangular sections facing transversely of said bearings and extending over a major portion of the arc of contact between the piston and the cylinder, said sections being connected at one extremity thereof to a circumferentially continuous portion of said skirt and entirely free for independent movement at the other extremity thereof, and said free ends being flared and adapted to have an extended bearing against the cylinder wall.

6. A trunk piston comprising a head, a skirt and bearings, said skirt being cut along and transversely thereof to provide a pair of integral, oppositely directed, substantially rectangular sections each at one end thereof to a circumferentially continuous portion of said skirt and free for outward movement at the other end thereof.

In testimony whereof we affix our signatures this 8th day of January, 1924.

JOHN FLAMMANG.
PERCY L. BOWSER.

CERTIFICATE OF CORRECTION.

Patent No. 1,795,595.  Granted March 10, 1931, to

JOHN FLAMMANG ET AL.

It is hereby certified that error appears in the printed specification of the above numbered patent requiring correction as follows: Page 3, line 42, claim 6, after the word "each" insert the word connected; and that the said Letters Patent should be read with this correction therein that the same may conform to the record of the case in the Patent Office.

Signed and sealed this 28th day of April, A. D. 1931.

(Seal)

M. J. Moore,
Acting Commissioner of Patents.